(12) United States Patent
Loomis

(10) Patent No.: US 7,589,671 B2
(45) Date of Patent: Sep. 15, 2009

(54) GPS NODE LOCATOR USING AN INTERMEDIATE NODE LOCATION FOR DETERMINING LOCATION OF A REMOTE NODE

(75) Inventor: Peter Van Wyck Loomis, Fremont, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 11/510,224

(22) Filed: Aug. 25, 2006

(65) Prior Publication Data

US 2008/0048912 A1 Feb. 28, 2008

(51) Int. Cl.
*G01S 1/08* (2006.01)
*G01S 1/00* (2006.01)
(52) U.S. Cl. .............. 342/386; 342/357.15; 342/357.05
(58) Field of Classification Search ................................
342/357.01–357.17, 386
See application file for complete search history.

(56) References Cited

U.S. PATENT DOCUMENTS

| | | | |
|---|---|---|---|
| 4,622,557 | A | 11/1986 | Westerfield |
| 5,119,102 | A | 6/1992 | Barnard |
| 5,345,244 | A | 9/1994 | Gildea et al. |
| 5,379,047 | A | 1/1995 | Yokev et al. .................. 42/457 |
| 5,379,224 | A | 1/1995 | Brown et al. |
| 5,420,592 | A | 5/1995 | Johnson |
| 5,430,759 | A | 7/1995 | Yokev et al. ................. 375/133 |
| 5,434,787 | A | 7/1995 | Okamoto et al. |
| 5,663,734 | A | 9/1997 | Krasner .................. 342/357.12 |
| 5,832,247 | A | 11/1998 | Gildea et al. |
| 5,892,819 | A | 4/1999 | Stumer .................. 379/211.02 |
| 5,960,355 | A | 9/1999 | Ekman et al. ............. 455/456.1 |
| 5,973,639 | A | 10/1999 | Biacs et al. ............ 342/357.03 |
| 6,018,784 | A | 1/2000 | Gildea et al. |
| 6,084,544 | A | 7/2000 | Camp, Jr. |
| 6,191,731 | B1 | 2/2001 | McBurney et al. ..... 342/357.05 |
| 6,225,945 | B1 | 5/2001 | Loomis |
| 6,269,446 | B1 | 7/2001 | Schumacher et al. |
| 6,421,608 | B1 | 7/2002 | Motoyama et al. .......... 701/213 |
| 6,430,415 | B1 | 8/2002 | Asashe et al. |
| 6,433,731 | B1 | 8/2002 | Sheynblat et al. |
| 6,433,734 | B1 | 8/2002 | Krasner |
| 6,570,530 | B2 | 5/2003 | Gaal et al. |

(Continued)

FOREIGN PATENT DOCUMENTS

WO  WO 2004090903 A1  10/2004

OTHER PUBLICATIONS

NXP swGPS Software by Philips, 8 page from www.software.nxp.com/about/technologies/spot/index.html, Eindhoven, The Netherlands.

(Continued)

*Primary Examiner*—Thomas H Tarcza
*Assistant Examiner*—Harry Liu

(57) ABSTRACT

A network-aided GNSS node locator for receiving GNSS signal samples. A GNSS positioning system may include a GNSS remote node for sampling a GNSS signal and transmitting the GNSS signal samples through a communication network having an intermediate node. The GNSS node locator receives the GNSS signal samples through the communication network, geolocates the intermediate node from a node ID, and uses the GNSS signal samples with the intermediate node geographical location for determining the geographical location of the remote node.

20 Claims, 5 Drawing Sheets

U.S. PATENT DOCUMENTS

| | | | |
|---|---|---|---|
| 6,597,311 B2 | 7/2003 | Sheynblat et al. | |
| 6,643,586 B2 | 11/2003 | Allen et al. | 701/213 |
| 6,661,372 B1 | 12/2003 | Girerd et al. | 342/357.12 |
| 6,677,894 B2 * | 1/2004 | Sheynblat et al. | 342/357.1 |
| 6,727,848 B2 | 4/2004 | Eschenbach | 342/357.09 |
| 6,762,715 B2 | 7/2004 | Awata et al. | |
| 6,813,498 B1 | 11/2004 | Durga et al. | 455/456.1 |
| 6,839,021 B2 | 1/2005 | Sheynblat et al. | |
| 6,865,478 B2 | 3/2005 | Sirola et al | |
| 6,873,288 B2 | 3/2005 | Heppe | 342/357.12 |
| 6,904,160 B2 | 6/2005 | Burgess | |
| 7,027,486 B2 | 4/2006 | Sullivan | 375/147 |
| 7,064,706 B2 * | 6/2006 | King et al. | 342/357.02 |
| 7,228,228 B2 | 6/2007 | Bartlett et al. | 701/207 |
| 7,236,883 B2 | 6/2007 | Garin et al. | 701/213 |
| 7,283,091 B1 | 10/2007 | Loomis | 342/357.15 |
| 2003/0016167 A1 | 1/2003 | Dooley et al. | |
| 2003/0095520 A1 * | 5/2003 | Aalbers et al. | 370/338 |
| 2003/0151547 A1 | 8/2003 | Mauro et al. | 342/357.15 |
| 2003/0195008 A1 * | 10/2003 | Mohi et al. | 455/456.5 |
| 2003/0197639 A1 | 10/2003 | Sheynblat et al. | 342/357.06 |
| 2003/0234741 A1 | 12/2003 | Rogers et al. | |
| 2004/0113837 A1 | 6/2004 | Heppe | 342/357.12 |
| 2004/0198386 A1 | 10/2004 | Dupray | 455/456.1 |
| 2005/0078032 A1 | 4/2005 | Gilkes | 342/357.15 |
| 2005/0116858 A1 | 6/2005 | Odamura | 342/357.09 |
| 2005/0212700 A1 * | 9/2005 | Diggelen et al. | 342/357.06 |
| 2005/0275726 A1 | 12/2005 | Abraham et al. | |
| 2006/0088015 A1 | 4/2006 | Kakivaya et al. | 370/338 |
| 2006/0088039 A1 | 4/2006 | Kakivaya et al. | 370/400 |
| 2006/0159055 A1 | 7/2006 | Turunen | 370/342 |
| 2006/0208943 A1 | 9/2006 | Gronemeyer | |
| 2006/0257122 A1 | 11/2006 | Yule et al. | |
| 2007/0030841 A1 | 2/2007 | Lee et al. | 370/352 |
| 2007/0063894 A1 | 3/2007 | Yu | 342/357.15 |
| 2007/0096981 A1 * | 5/2007 | Abraham | 342/357.15 |
| 2007/0126625 A1 | 6/2007 | Townsend et al. | 342/357.02 |
| 2007/0252758 A1 * | 11/2007 | Loomis | 342/357.15 |
| 2008/0120024 A1 | 5/2008 | Obradovich et al. | |

OTHER PUBLICATIONS

USPTO action document mailed Mar. 31, 2009 for U.S. Appl. No. 11/510,225.

USPTO action document mailed Sep. 29, 2008 for U.S. Appl. No. 11/510,225.

USPTO action document mailed Jun. 2, 2009 for U.S. Appl. No. 11/510,225 9 pages.

Loomis, USPTO U.S. Appl. No. 11/510,225 "Remote Node Providing GPS Signal Positioning Over a Communication Network" filed Aug. 25, 2006.

USPTO action mailed Nov. 28, 2007 for U.S. Appl. No. 11/510,225, 15 pages.

USPTO action mailed May 30, 2008 for U.S. Appl. No. 11/510,225, 8 pages.

USPTO action mailed Sep. 29, 2009 for U.S. Appl. No. 11/510,225, 7 pages.

USPTO action mailed Aug. 29, 2008 for U.S. Appl. No. 11/715,580, 12 pages.

USPTO action mailed Nov. 21, 2008 for U.S. Appl. No. 11/715,580, 6 pages.

USPTO action mailed Feb. 27, 2009 for U.S. Appl. No. 11/715,580, 7 pages.

* cited by examiner

US 7,589,671 B2

GPS NODE LOCATOR USING AN INTERMEDIATE NODE LOCATION FOR DETERMINING LOCATION OF A REMOTE NODE

BACKGROUND OF THE INVENTION

1. Field of the Invention

The invention relates generally to global positioning system (GPS) positioning and more particularly to GPS positioning where a GPS-based position of a remote node is determined by a GPS node locator connected through a communication network.

2. Description of the Prior Art

The United States government maintains a global positioning system (GPS) having a constellation of earth orbiting GPS satellites. The satellites broadcast GPS signals having location-determination information that can be received and decoded by a GPS receiver for determining a GPS-based geographical location of the receiver and a GPS-based time.

The typical acquisition process for finding signal power in a GPS signal involves correlating pseudorandom (PRN) codes carried on incoming satellite signals against locally generated PRN code replicas. The code replicas are correlated at time or phase offsets with respect to a local reference time through an entire code epoch until the time or phase offset is found that provides the highest correlation. This process is known as a code search.

When signal power is found at a time or phase offset, the GPS receiver determines data bit timing from inversions of the code phase correlations between code epochs. The GPS receiver uses the data bit timing for monitoring the GPS data bits until a Z-count is decoded. A time-of-transmission for the GPS signal is read from the Z-count. The GPS time-of-transmission is used with ephemeris information that is decoded from the GPS data bits or stored locally and updated at intervals for calculating the current location-in-space of a GPS satellite. The GPS receiver uses either the location-in-space and an assumed local position with the time or phase offset, or the data bit timing with the time or phase offset for providing a pseudorange to the GPS satellite. Four pseudoranges are used with the locations-in-space of four GPS satellites for resolving the time error of the GPS reference time and the three dimensions of the geographical location of the GPS receiver.

The Z-counts for the GPS satellites are carried at six second intervals in the subframes of the GPS signal data bits. Typically, in order to ensure that random data is not mistaken for the Z-count, two subframes or slightly more than twelve seconds must be observed. Unfortunately, this requires that the GPS receiver have full power consumption for this time in order to ensure that a Z-count is detected.

SUMMARY OF THE INVENTION

It is therefore an object of the present invention to provide a GPS positioning system having a network-aided GPS node locator connected through a communication network to one or more remote nodes where the remote nodes sample GPS signals from GPS satellites and transmit the GPS signal samples through a communication network to the GPS node locator. The GPS remote nodes are connected into the network with intermediate nodes. The GPS node locator uses network node ID's of the intermediate nodes for geolocating the intermediate nodes and uses the geographical locations of the intermediate nodes as approximate locations of the remote nodes with data for the GPS signal samples for determining accurate GPS-base locations of the remote nodes.

In a preferred embodiment the present invention is an apparatus for determining a global navigation satellite system (GNSS)-based location of a remote node, comprising: a geolocator for using a node ID associated with an intermediate node in communication network for determining a geographical location of said intermediate node; and a GNSS signal sample processor for receiving GNSS signal samples through said intermediate node, said GNSS signal samples corresponding to digitized samples of a GNSS signal received by said remote node; and using said intermediate node location with said GNSS signal samples for determining a GNSS-based geographical location of said remote node.

In another preferred embodiment the present invention is a method for determining a global navigation satellite system (GNSS)-based location of a remote node, comprising: receiving GNSS signal samples through a communication network having an intermediate node, said GNSS signal samples corresponding to digitized samples of a GNSS signal received by said remote node; geolocating a node ID associated with said intermediate node for determining a geographical location of said intermediate node; and determining a GNSS-based geographical location of said remote node based on said GNSS signal samples and said intermediate node location.

In another preferred embodiment the present invention is a remote node for operation with a communication network for determining a global navigation satellite system (GNSS)-based location of the remote node, comprising: a GNSS antenna for receiving a GNSS signal; a digitizer for sampling said GNSS signal for providing GNSS signal samples; and a remote modem for transmitting said GNSS signal samples through a communication network having an intermediate node having a node ID for reception by a GNSS node locator, said GNSS node locator constructed for geolocating said node ID for determining a geographical location of said intermediate node and using said intermediate node location with said GNSS signal samples for determining a GNSS-based geographical location of the remote node.

In another preferred embodiment the present invention is a method in a remote node for operation with a communication network for determining a global navigation satellite system (GNSS)-based location of the remote node, comprising: receiving a GNSS signal; digitizing said GNSS signal for providing GNSS signal samples; and transmitting said GNSS signal samples through a communication network having an intermediate node having a node ID for reception by a GNSS node locator, said GNSS node locator constructed for geolocating said node ID for determining a geographical location of said intermediate node and using said intermediate node location with said GNSS signal samples for determining a GNSS-based geographical location of the remote node.

A benefit of the present invention is that a remote node remains powered only a short time for sampling the GPS signal and transmitting the GPS signal samples into a communication network in order for the GPS-based location of the remote node to be determined.

Another benefit of the present invention is that a communication network carries only a relatively small amount of binary data from a remote node to a GPS node locator for the GPS-based location of the remote node to be determined.

Another benefit of the present invention is that a remote node is low cost because the remote node only provides GPS signal samples while the GPS node locator performs the signal and navigation processing for determining the GPS-based location of the remote node.

Another benefit of the present invention is that a remote node need not observe a Z-count for a GPS node locator to determine a GPS-based location of the remote node.

These and other objects, embodiments and benefits of the present invention will no doubt become obvious to those of ordinary skill in the art after reading the following detailed descriptions and viewing the various drawings.

BEST MODE FOR CARRYING OUT THE INVENTION

The details of best mode for carrying out the ideas of the invention will now be presented. It should be understood that it is not necessary to employ all of these details in order to carry out the idea of the invention. Several subsets, equivalents and supersets of the best mode described below will undoubtedly be apparent to someone skilled in the art after reading these details as within the scope of the idea of this invention. The description of these details is not intended to eliminate these subsets, equivalents and supersets from the idea of the invention that is presented below in the claims.

The best mode is described in terms of the global positioning system (GPS) having GPS signals modulated with a coarse/acquisition (C/A) direct sequence spreading code. However, the idea of the best mode may be applied with other GPS signal codes. Further, the idea may be carried out with a global navigation satellite system (GNSS) where the global positioning system (GPS), the global orbiting navigation system (GLONASS), the Galileo system or the like, or a combination of these systems provides signals having similar spreading codes. It should also be noted that pseudolites may be used in place of satellites for broadcasting GNSS signals.

Figure 1:
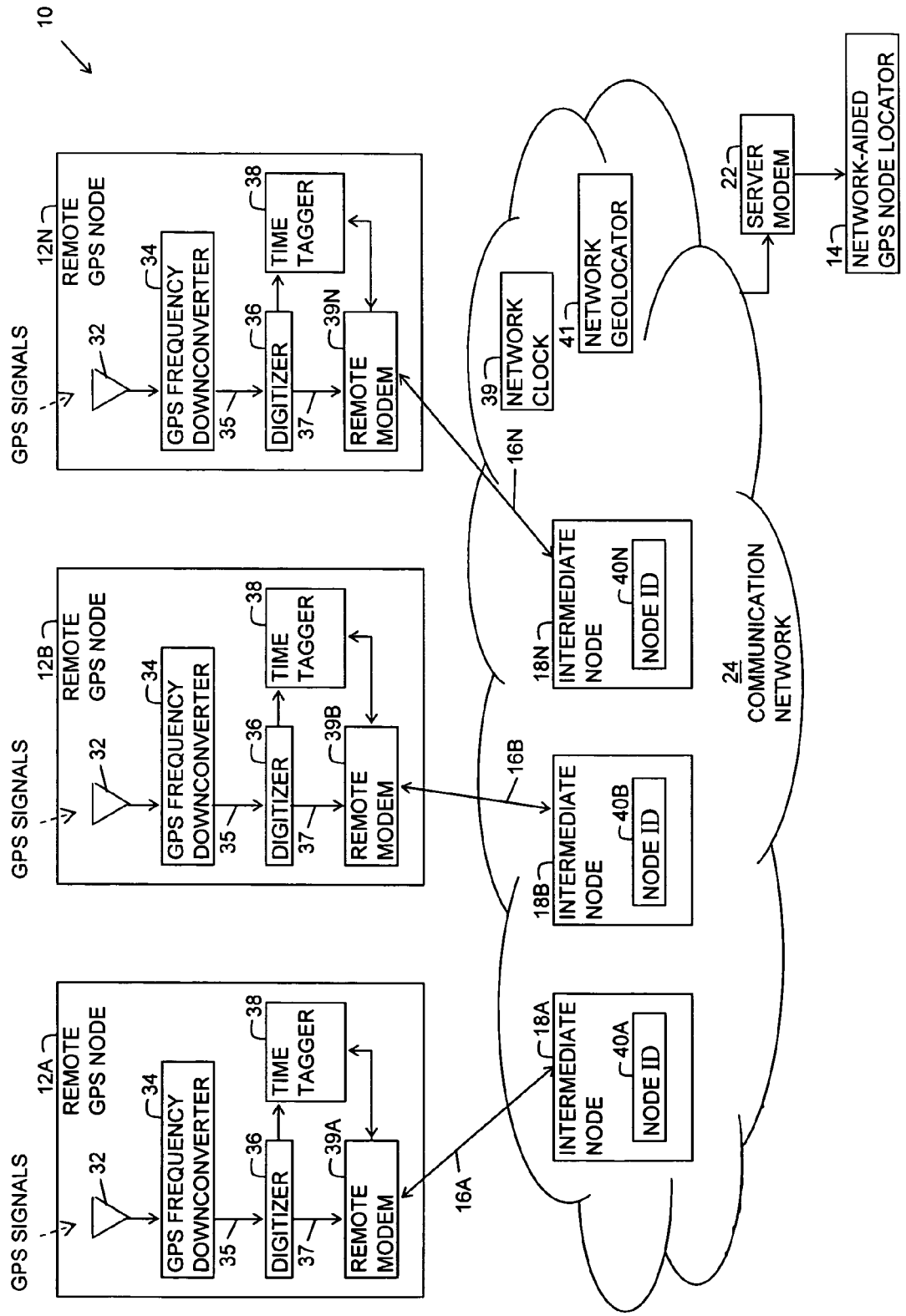
FIG. 1 is a block diagram of a GPS position determination system having remote nodes and a network-aided GPS node locator connected to the remote nodes through intermediate nodes of a communication network.

FIG. 1 is a block diagram of a GPS positioning system 10 for an embodiment of the present invention. The GPS positioning system 10 includes one or more remote GPS nodes 12A-N and a network-aided GPS node locator 14. The remote nodes 12A-N communicate through communication links 16A-N, respectively, to intermediate nodes 18A-N, respectively. The intermediate nodes 18A-N communicate with a server modem 22 through a communication network 24. The server modem 22 passes data that it has received through the network 24 to the GPS node locator 14 for an embodiment of the present invention.

The intermediate nodes 18A-N are a part of the communication network 24, or entry points or gateways to the communication network 24. In either case, the intermediate nodes 18A-N may communicate through the network 24 directly to the server modem 22 or there may be many nodes within the communication network 24 between the intermediate nodes 18A-N and the server modem 22.

The network 24, in an exemplary case, is the Internet and the intermediate nodes 18A-N are Internet Service Providers (ISP)s for the remote nodes 12A-N. For example, the remote node 12A may be connected through a wireless link 16A to a local transponder for the intermediate node 18A; the remote node 12B may be connected through a digital subscriber line (DSL) 16B to a DSL switch for the intermediate node 18B; and the remote node 12N may be connected through a fiber optic link 16N to an optical switch for the intermediate node 18N. It should be noted that at one extreme all the communication links 16A-N are of the same type and at the other extreme all the communication links 16A-N are of different types. The technologies that may used includes but are not limited to wide local area network (WLAN), IEEE 802.11, broadband wireless (BW), local multi-point distribution service (LMDS), multi-channel multipoint distribution service (MMDS), Bluetooth™ (version 1.2, version 2.0+(EDR) enhanced data rate), GSM, CDMA, TDMA, AMPS, POTS, IDSN, USB (USB1.2 & USB2.0), Firewall, IEEE1394, cable modem, and their extensions.

The remote nodes 12A-N includes a GPS antenna 32, a GPS frequency downconverter 34, a digitizer 36, a time tagger 38. The remote nodes 12A-N also include respective remote modems 39A-N. The GPS antenna 32 converts airwave GPS signals from GPS satellites to conducted GPS signals. The GPS frequency downconverter 34 downconverts the frequencies of the conducted GPS signals from the GPS satellite signal frequency to a GPS signal 35 at a lower frequency.

In a first embodiment the frequency downconverter provides the GPS signal 35 as a complex signal having I (in-phase) and Q (quadrature phase) components. In a second embodiment the GPS signal 35 is a simple signal having only a single phase. The description below describes the first embodiment for the GPS signal 35 as a complex signal. In the second embodiment the GPS signal 35 may be viewed as having I only GPS signal samples. The digitizer 36 samples the GPS signal 35 for providing digital GPS signal samples 37.

The sampling time period for the I and Q GPS signal samples is about ten milliseconds up to about five hundred milliseconds. The short sampling periods are beneficial for using less bandwidth for the communication network 24. The longer sampling time periods may be needed when the GPS signals have low levels, such as when they are being received within a building. It should be noted that the digital signal samples may or may not have a GPS data bit edge for C/A GPS twenty millisecond code data. The I and Q GPS samples may be one bit, two bits or more than two bits for one or each of I and Q. The samples at this stage represent several GPS signals simultaneously received by the GPS antenna 32 from several GPS satellites.

A network clock time is maintained in the network 24 by a network clock 39 to an accuracy of 100 milliseconds or better. The intermediate nodes 18A-N receive the clock time from the network 24 and pass it to the remote modems 39A-N. The remote modems 39A-N pass the network time to the time tagger 38. The time tagger 38 receives a trigger from the IQ digitizer 36 for time tagging for the GPS signal sample and passing the time tags to the remote modems 39A-N. The time tag is calibrated in the time tagger 38 to correspond to the time that the GPS signals represented by the GPS signal samples were received by the GPS antenna 32. The remote modems 39A-N convert the IQ digital GPS signal samples and time tag into binary GPS signal sample data. An accuracy of one hundred milliseconds or better is expected for the network clock time.

The remote modems 39A-N segment the binary GPS signal sample data into packets, if necessary, and add the required preambles, headers, appendages, parities, framing, scrambling and the like for transmitting to the intermediate nodes 18A-N. The intermediate nodes 18A-N provide the preambles, headers, appendages, parities, framing, scrambling and the like that are required for passing the GPS signal sample data into the network 24 and for passing the network clock time to the remote modems 39A-N.

The intermediate nodes 18A-N have node identifications (ID)'s 40A-N, respectively. The intermediate node IDs 40A-N may be Internet Protocol (IP) addresses or transponder identifications. Each intermediate node 18A-N may include its node ID 40A-N with the GPS signal sample data that is passed through the network 24 to the base server 22. Or, the remote node 12A-N may determine the node ID 40A-N by querying the intermediate node 18A-N it which case it attaches the node ID 40A-N to the GPS signal sample data. Or, the GPS node locator 14 may do a trace route through the network 24, possibly through many nodes, for determining the node ID 40A-N. The server modem 22 passes the GPS signal sample data and the intermediate node ID 40A-N to the GPS node locator 14. It should be noted that these different methods for passing the node ID 40A-N to the GPS node locator 14 may all be used within the same system 10.

The intermediate nodes 18A-N are expected to be stationary. An optional network geolocator 41 stores the geographical locations of the intermediate nodes 18A-N in association with the corresponding node IDs 40A-N. The intermediate node locations may, for example, be determined with a GPS receiver that is hand carried to the site, by a GIS mapping survey, or by geocoding the intermediate nodes 18A-N. The term "geocoding" refers to the process of assigning geographical coordinates such as latitude and longitude, with or without altitude, to other information such as street addresses, IP addresses, ZIP codes, and generally to any identifier having a physical location defined in some way other than geographical coordinates. The geographical coordinates may also be in universal transverse Mercator (UTM), military grid reference system (MGRS), universal polar stereographic (UPS), ordinance survey of Great Britain, Earth centered Earth fixed (ECEF) Cartesian coordinates, State Plane coordinates, GPS Cartesian coordinates of xyz, and the like. In general, a geographical location is a point in space at or near the surface of the Earth defined mathematically in two or three dimensions in relation to the Earth by the point's geographical coordinates.

The remote node 12A-N is expected to be mobile but located within one-hundred fifty kilometers (for C/A code GPS signals) of any one of the intermediate nodes 18A-N with which it has the technology to communicate. Typically, the remote node 12A-N is located within twenty kilometers of the one of the intermediate nodes 18A-N with which it communicates. For example, a remote node 12A may communicate through the intermediate node 18A to the server mode 22. After the remote node 12A is moved many kilometers, it may communicate through the intermediate node 18B to the server modem 22.

In general, the communication links 16A-N have communication signal transit times less than one-half the repetition time period of the code cycle of the GNSS signals that are received and processed by the system 10. The maximum physical distance between the remote node 12A-N and the corresponding intermediate node 18A-N is ½×(code cycle time period)/C where C is the speed of light. Where the GNSS signal is the C/A code GPS signal having a one millisecond code cycle time period, the physical distance can be up to one-hundred fifty kilometers. For a GNSS signal having a one-half millisecond code cycle time, the distance can be up to seventy-five kilometers. For a GNSS signal having a two millisecond code cycle time, the distance may be up to three hundred kilometers, and so on.

The remote node 12A-N may be separated from the server modem 22 (and the GPS node locator 14) by much more than one-hundred fifty kilometers, for example five-hundred kilometers, one-thousand kilometers, ten-thousand kilometers or even more. The communication network 24 may include one or more geosynchronous satellite communication links between the intermediate node 18A-N and the server modem 22.

Figure 2:
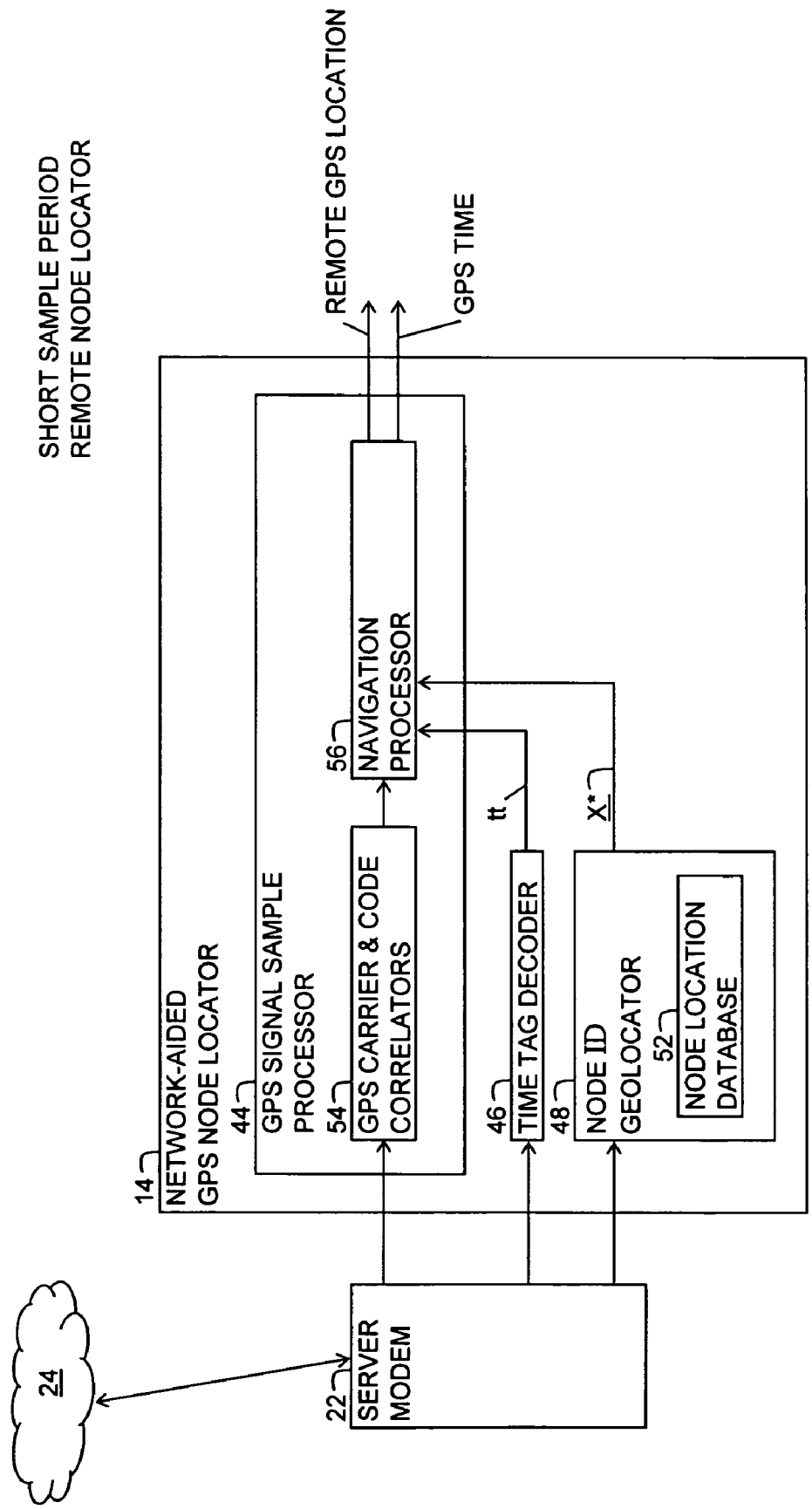
FIG. 2 is a block diagram of the GPS node locator of FIG. 1.

FIG. 2 shows a block diagram of the network-aided GPS node locator 14. The GPS node locator 14 includes a GPS signal sample processor 44, a time tag decoder 46 and a node ID geolocator 48. The following explanation is made in terms of a single remote GPS node 12 with a single intermediate node 18 having a node ID 40 as representative of any of the remote GPS nodes 12A-N with any of the intermediate nodes 18A-N having the node IDs 40A-N.

The time tag decoder 46 passes the GPS signal sample time tag from the base server 22 to the GPS signal sample processor 44. The geolocator 48 receives the node ID 40 from the base server 22, either attached or included with the GPS signal sample data, or by asking the base server 22 to do a trace route. A database 52 is included in the geolocator 48 for the geographical location of the intermediate node 18 associated with the node ID 40. Alternatively, the node ID 40 is geolocated by the network geolocator 41 and the location of the corresponding intermediate node 18 is obtained through the network 24. In either case, accuracies of better than several hundred meters are typical.

The term "geolocating" refers to the process of using, typically with a table lookup in a database, physical but non-geographical location information about an object, such as a street address, an IP address for an ISP switch (typically located at a telephone switching station), an IP address of an Internet node, an identifier for a cell having a cellphone tower, a ZIP code and the like for determining a geographical location of the object. The intermediate node 40 may know its geographical location A-N in which case it attaches the location to the data for the GPS signal samples or the GPS node locator 14 may retrieve the location through the network 24 with a trace route.

The GPS signal sample processor 44 includes GPS carrier and code correlators 54 and a navigation processor 56. The carrier and code correlators 54 operate on the I and Q GPS signal samples for recovering the GPS signal carrier frequency and providing a time offset (also known as a code phase or code phase offset) with respect to an internal GPS reference timer for the correlation between a pseudorandom noise (PRN) code carried in the GPS signal samples for a particular GPS satellite and an internally generated replica of the PRN code. Several PRN codes are applied simultaneously so that time offsets are determined for several GPS satellites. Typically, the time offsets have a modulo of one millisecond for the GPS C/A code. However, a longer modulo may be obtained.

In a second embodiment for simple (I only) the GPS signal samples, the GPS carrier and code correlators 54 are preceded by an IQ frequency downconverter and an IQ digitizer for converting the simple GPS signal samples to I and Q GPS signal samples for processing by the GPS carrier and code correlators 54.

The code phases are passed to the navigation processor 56. The navigation processor 56 uses the location of the intermediate node 18 from the geolocator 48 (or network geolocator 41) and the time tag from the time tag decoder 46 for processing the code phases in order to determine a GPS-based location of the remote node 12 and an accurate GPS-based time when the GPS signal was received at the remote node 12. It should be noted that the location of the intermediate node 18 is used as a substitute for an assumed location of the remote node 12 for aiding the process of determining GPS-based location of the remote node 12. Typically the intermediate node 18 is expected to be within twenty kilometers of the remote node 12.

Figure 3:
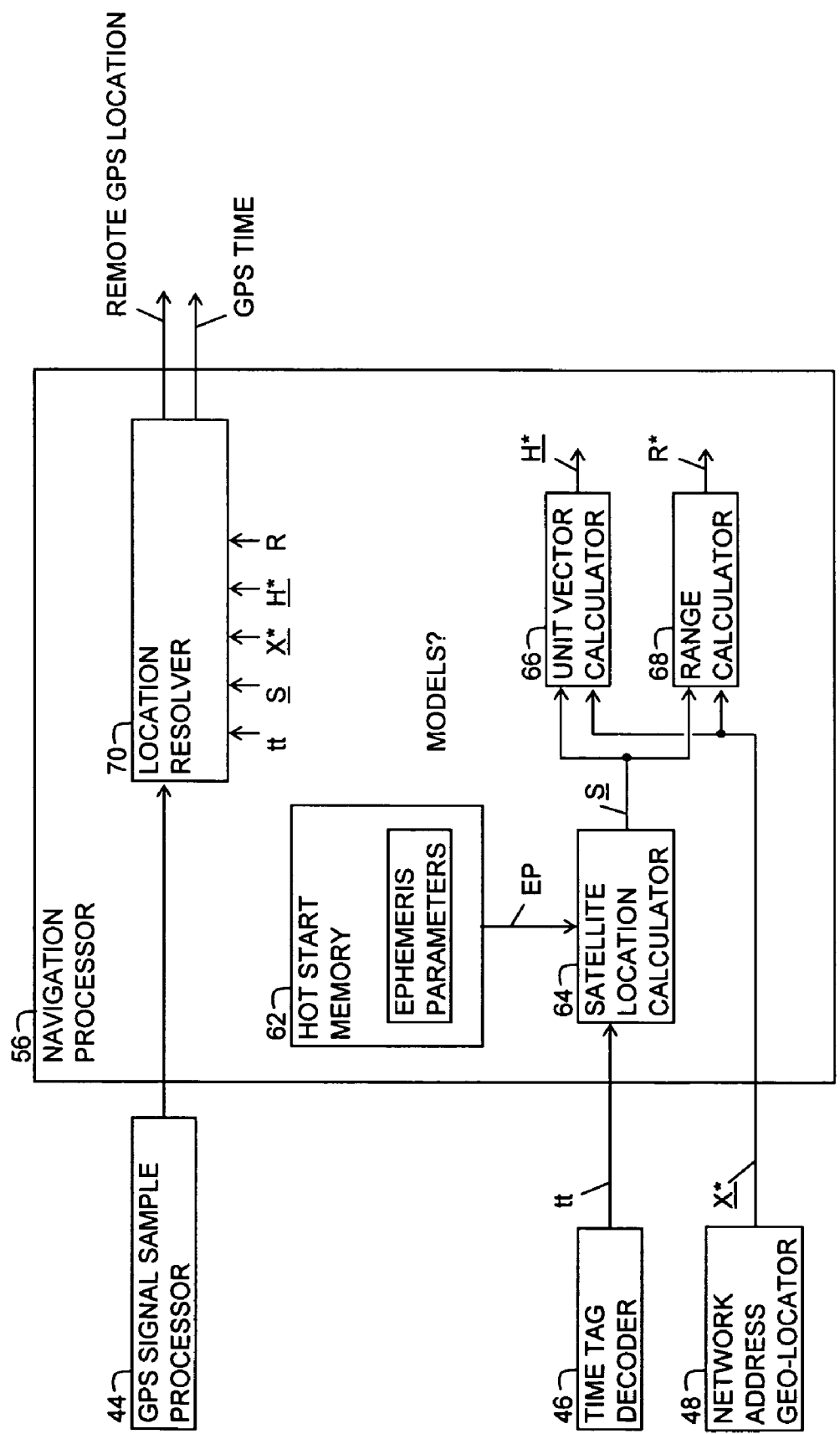
FIG. 3 is a block diagram of a GPS signal sample processor of the GPS node locator of FIG. 2.

FIG. 3 shows a block diagram of the navigation processor 56. The navigation processor 56 includes a hot start memory 62, a satellite location calculator 64, a unit vector calculator 66, a range calculator 68 and a location resolver 70. The hot start memory 62 stores ephemeris parameters EP for the GPS satellites and ionospheric and tropospheric models for locations on Earth. Alternatively, the parameters EP and models are obtained through the network 24.

The following explanation is made in terms of a code phase that is determined for a single GPS satellite with the understanding that the navigation processor 56 is simultaneously processing code phases for several GPS satellites. The satellite location calculator 64 uses a time tag it from the time tag decoder 46 with the ephemeris parameters EP for providing an estimated location-in-space vector S for the GPS satellite. The unit vector calculator 66 uses the estimated location-in-space vector S and the geolocated intermediate node location vector X* for providing an estimated unit vector H* for the direction between the GPS satellite and the intermediate node 18 (and approximately between the GPS satellite and the remote node 12). The range calculator 68 uses the difference between the location-in-space vector S and the intermediate node location vector X* for providing a calculated range R between the GPS satellite and the intermediate node 18 (and approximately between the GPS satellite and the remote node 12).

The location resolver 70 uses the code phase from the GPS signal sample processor 44, the time tag it, the satellite location vector S, the intermediate node location vector X*, the unit vector H*, the calculated range R and the speed of light for calculating a travel time (sometimes termed a calculated range) from the GPS satellite to the intermediate node 18. This calculated travel time multiplied by the speed of light is approximately equal to a gross pseudorange from the GPS satellite to the remote node 12.

The gross pseudorange may at this point be used to refine the transmission time of the GPS signal from the GPS satellite, which was in a first estimate assumed to be the time tag tt. A new time tag ttt is computed by subtracting the calculated transit time from the time tag tt. The use of the more accurate time ttt with ephemeris parameters EP in the GPS satellite orbit equations results in a more accurate satellite location vector S1.

Using the calculated range R to the intermediate node 18 and the measured code phase, a full pseudorange can be determined. A nominal code phase is constructed for each satellite by calculating the gross pseudorange modulo one millisecond. A difference code phase is constructed for each satellite by subtracting the nominal code phase from the measured code phase. The satellite with the strongest signal is chosen as a pivot satellite. If a double-difference between the pivot satellite difference code phase and another satellite difference code phase is more than one-half millisecond, the difference code phase of the other satellite is adjusted by one millisecond until the double difference is less than one-half millisecond.

When all the adjustments are done, the difference code phase is added to the calculated range R to create the full pseudorange for that satellite. The GPS-based location of the remote node 12 is resolved using four pseudoranges. An accurate GPS-based time that the GPS signal was received by the remote node 12 is also determined as a part of the resolution of the GPS-based position.

Figure 4:
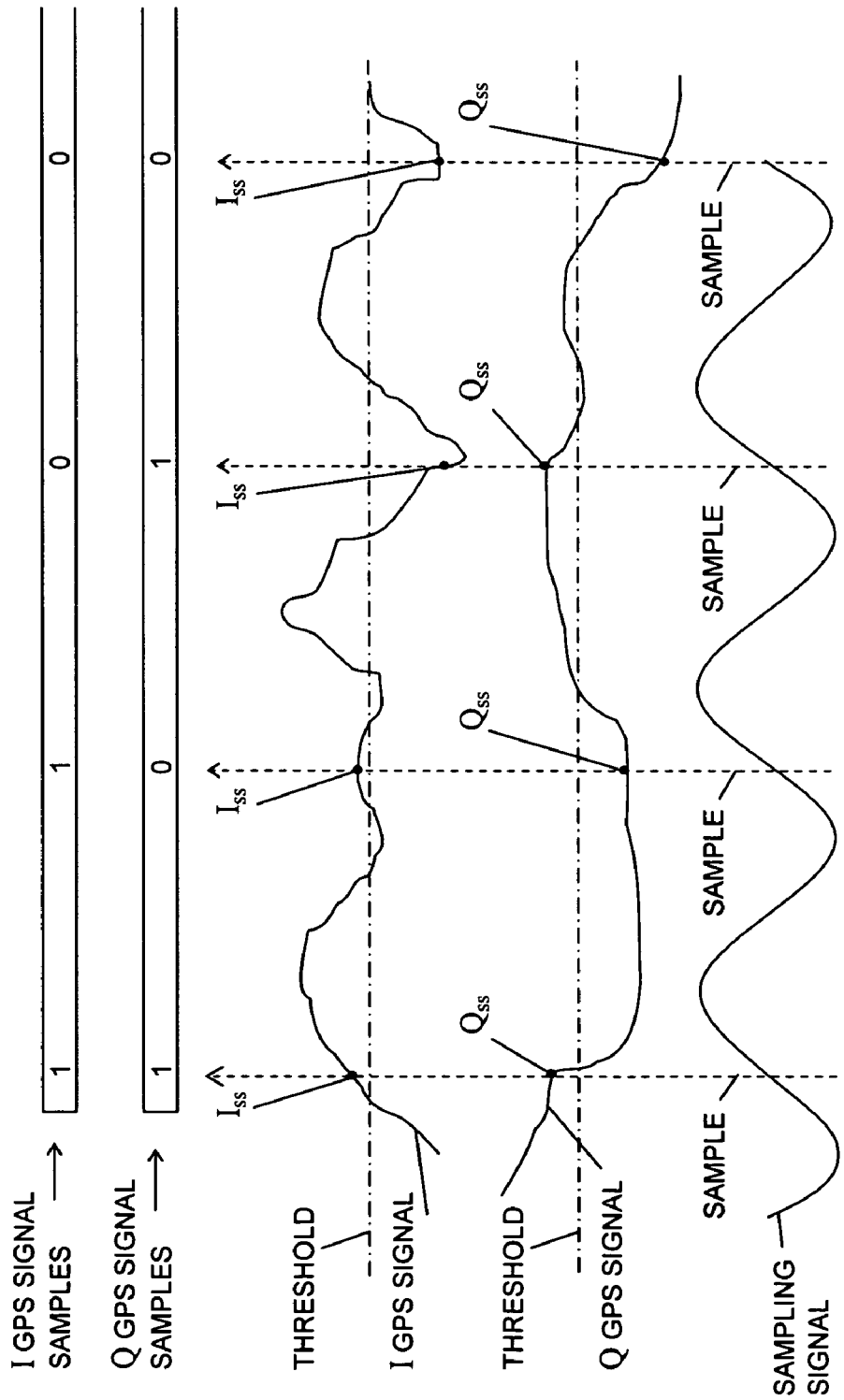
FIG. 4 is a signal chart for GPS signal samples for the system of FIG. 1.

FIG. 4 is a time chart of the I (in-phase) and Q (quadrature phase) GPS signal samples 37 for an exemplary GPS signal 35. The GPS signal 35 has I and Q components in a lower frequency representation of the GPS signal received by the GPS antenna 32. Conceptually, the I and Q GPS signal 35 is captured by a sampling signal at "sample" times. In a preferred embodiment, the I and Q GPS signal 35 is integrated for time periods centered at the sample times. The levels of the I and Q GPS signal 35 at the sample times are Iss and Qss, respectively. The Iss and Qss levels are compared to a threshold. The I GPS signal sample Iss takes a "1", or the equivalent, when the Iss level is greater than the threshold and takes a "0", or the equivalent, when the Iss level is less than the threshold. The same for the Q GPS signal sample Qss. For two bit sampling, three thresholds are used and the I and Q GPS signal samples Iss and Qss take the values "11", "10", "01 and "00".

Figure 5:
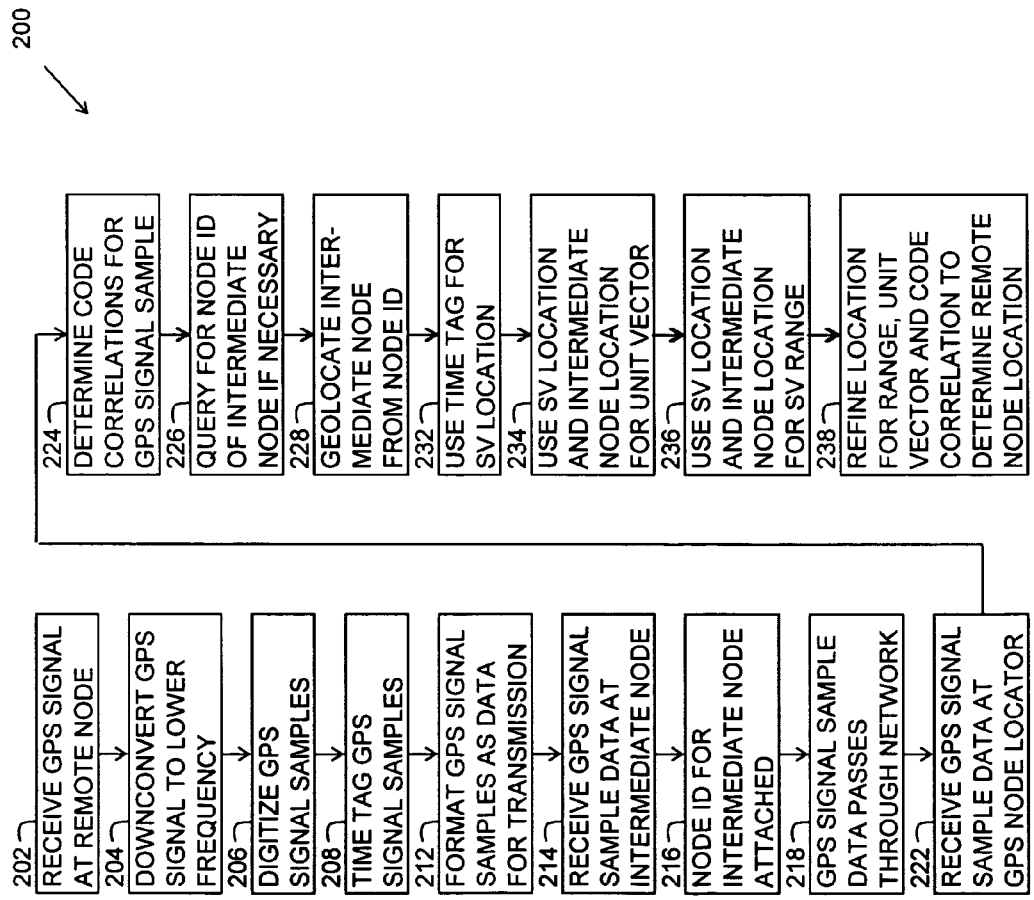
FIG. 5 is a flow chart of a method of the present invention for determining a GPS-based position of a remote node with a network-aided GPS node locator connected through intermediate nodes of a communication network.

FIG. 5 is a flow chart of a method of the present invention for determining a GPS-based position of a remote node. The steps of the method may be encoded by a manufacturing process onto a tangible medium 200 in a form that is readable by a computer or computing device for directing an apparatus for carrying out one or more of the steps.

The remote node receives a GPS signal in a step 202. In a step 204 the remote node downconverts the GPS signal to a lower frequency. The downconverted GPS signal may be a complex signal having I and Q signal components or a simple signal. In a step 206 the downconverted GPS signal is sampled and digitized. In a step 208 a network clock time is used to time tag the GPS signal samples with an approximate time that the GPS signal was received.

The GPS signal samples are formatted as binary data in a step 212 for transmission into a communication network. In a step 214 the GPS signal sample data is received by an intermediate node. In a step 216 a node ID is attached to the GPS signal sample data as described above. In a step 218 the GPS signal sample data passes through the communication network, possibly through many nodes. In a step 222 the GPS signal samples are received through the communication network at a GPS node locator. When the GPS signal samples provided by the remote node are not already in a complex I and Q component form, the GPS node locator frequency converts the simple GPS signal samples to a complex I and Q component GPS signal samples.

The GPS node locator determines code correlation time offsets for the GPS signal samples in a step 224. In a step 226 when the node ID is not attached, the GPS node locator finds the node ID by querying the communication network as described above. In a step 228 the node ID is geolocated for finding a geographic location for the intermediate node.

A satellite (SV) location-in-space is calculated by the GPS node locator in a step 232 from satellite orbital ephemeris parameters and the network clock time tag for the time that the GPS signal was received at the remote node. The location of the intermediate node is now used as an assumed approximate location of the remote node. In a step 234 the SV location-in-space and the intermediate node location are used for calculating a unit vector between the intermediate node and the satellite. In a step 236 the SV location-in-space and the intermediate node location are used for calculating a range between the intermediate node and the satellite. Then, in a step 238 the location of the remote node is resolved that satisfies the code correlation time offsets for four or more GPS satellites.

Although the present invention has been described in terms of the presently preferred embodiments, it is to be understood that such disclosure is not to be interpreted as limiting. Various subsets and equivalents will no doubt become apparent to those skilled in the art after having read the above disclosure. Accordingly, it is intended that the appended claims be interpreted as covering the true spirit and scope of the invention.

What is claimed is:

1. A method for determining a global navigation satellite system (GNSS)-based location of a remote node, comprising:
   receiving GNSS signal samples through a communication network from said remote node for offloading computation from said remote node to a processor location, said communication network having an intermediate node not co-located with said remote node, all said GNSS signal samples corresponding to digitized samples of a GNSS signal, said GNSS signal received by said remote node and digitized in said remote node to convert said GNSS signal to said digitized samples, wherein said GNSS signal samples are not pseudoranges;
   geolocating a node ID associated with said intermediate node for determining a geographical location of said intermediate node; and
   determining, at said processor location separate from said remote node and said intermediate node, a GNSS-based geographical location of said remote node based on said GNSS signal samples and said intermediate node location.

2. The method of claim 1, wherein:
   determining said GNSS-based remote node location includes using said intermediate node location as an approximate geographical location of said remote node; using said GNSS signal samples for determining code correlation time offsets; and using said code correlation time offsets for refining said approximate location for determining said GNSS-based remote node location.

3. The method of claim 1, wherein:
   geolocating said node ID includes receiving at said processor location an Internet Protocol (IP) address for an Internet Service Provider (ISP) acting as an entry point for said remote node into said communication network and determining said intermediate location based on said IP address.

4. The method of claim 1, wherein:
   geolocating said node ID includes receiving at said processor location an identifier corresponding to a cell having a transponder for receiving a wireless signal carrying said GNSS signal samples from said remote node; and converting said identifier to a geographical location of said cell for said intermediate node location.

5. The method of claim 1, further comprising:
   receiving from said remote node a time tag for a time that said GNSS signal is received at said remote node, said time tag based on a network clock time for said communication network;
   determining at said processor location a location-in-space for a GNSS satellite based on said time tag; and
   using said GNSS satellite location-in-space for determining said GNSS-based remote node location.

6. The method of claim 5, wherein:
   determining said GNSS-based remote node location includes using said intermediate node location for determining a unit vector between said GNSS satellite location-in-space and said intermediate node location; and using said unit vector for determining said GNSS-based remote node location.

7. The method of claim 5, wherein:
   determining said GNSS-based remote node location includes using said intermediate node location for calculating a range between said GNSS satellite location-in-space and said intermediate node location; and using said calculated range for determining said GNSS-based remote node location.

8. The method of claim 1, wherein:
   receiving said GNSS signal samples through said communication network includes receiving said signal samples at a location more than one-hundred fifty kilometers from said intermediate node and said remote node.

9. The method of claim 1, wherein:
   said GNSS signal samples are signal samples captured at sample times for said GNSS signal received at said remote node from a GNSS satellite and then converted to a digital format.

10. The method of claim 1, wherein:
    receiving said GNSS signal samples through said communication network includes receiving said signal samples over a distance of more than one-half a code cycle time period of said GNSS signal divided by the speed of light.

11. An apparatus for determining a global navigation satellite system (GNSS)-based location of a remote node, comprising:
    a geolocator for using a node ID associated with an intermediate node, not co-located with said remote node, in a communication network for determining a geographical location of said intermediate node; and
    a GNSS signal sample processor at a location separate from said remote node and said intermediate node, the GNSS signal sample processor configured to offload position determination computation from said remote node by receiving GNSS signal samples through said intermediate node, all said GNSS signal samples corresponding to digitized samples of a GNSS signal received by said remote node and digitized in said remote node to convert said GNSS signal to said digitized samples, wherein said GNSS signal samples are not pseudoranges; and using said intermediate node location with said GNSS signal samples for determining a GNSS-based geographical location of said remote node.

12. The apparatus of claim 11, wherein:
    the GNSS signal sample processor includes a GNSS code correlator for using said GNSS signal samples for determining code correlation time offsets; and a navigation processor for using said intermediate node location as an approximate geographical location of said remote node and using said code correlation time offsets for refining said approximate location for determining said GNSS-based remote node location.

13. The apparatus of claim 11, wherein:
    the geolocator is constructed for determining said intermediate node location based on an Internet Protocol (IP) address as said node ID where said intermediate node acts as an Internet Service Provider (ISP) for said remote node into the Internet.

14. The apparatus of claim 11, wherein:
    the geolocator is constructed for using an identifier corresponding to a cell having a transponder for receiving a wireless signal carrying said GNSS signal samples from said remote node; and converting said identifier to a geographical location for said cell as said intermediate node location.

15. The apparatus of claim 11, further comprising:
a time tag decoder for receiving at said GNSS signal sample processor a time tag for a time that said GNSS signal is received at said remote node, said time tag based on a network clock time for said communication network; and wherein:
the GNSS signal sample processor is constructed for determining a location-in-space for a GNSS satellite based on said time tag; and using said GNSS satellite location-in-space for determining of said GNSS-based remote node location.

16. The apparatus of claim 15, wherein:
the GNSS signal sample processor is constructed for using said GNSS satellite location-in-space and said intermediate node location for determining a unit vector between said GNSS satellite and said intermediate node, and using said unit vector for determining said GNSS-based remote node location.

17. The apparatus of claim 15, wherein:
the GNSS signal sample processor is constructed for using said GNSS satellite location-in-space and said intermediate node location for calculating a range between said GNSS satellite and said intermediate node; and using said calculated range for determining said GNSS-based remote node location.

18. The apparatus of claim 11, wherein:
the GNSS signal sample processor is located more than one-hundred fifty kilometers from said intermediate node and said remote node.

19. The apparatus of claim 11, wherein:
said GNSS signal samples are signal samples captured at sample times for said GNSS signal received at said remote node from a GNSS satellite and then converted to a digital format.

20. The apparatus of claim 11, wherein:
the GNSS signal sample processor is separated from said remote node by a distance of more than one-half a code cycle time period of said GNSS signal divided by the speed light.

* * * * *